(12) United States Patent
Hommi (10) Patent No.: US 7,828,394 B2
(45) Date of Patent: Nov. 9, 2010

(54) VEHICLE AND CONTROL METHOD OF VEHICLE SLIP-DOWN VELOCITY

(75) Inventor: Akira Hommi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1299 days.

(21) Appl. No.: 10/565,643

(22) PCT Filed: Jul. 26, 2004

(86) PCT No.: PCT/JP2004/011005

§ 371 (c)(1),
(2), (4) Date: Jan. 24, 2006

(87) PCT Pub. No.: WO2005/009814

PCT Pub. Date: Feb. 3, 2005

(65) Prior Publication Data

US 2006/0238023 A1    Oct. 26, 2006

(30) Foreign Application Priority Data

Jul. 29, 2003    (JP)    ............................... 2003-203011

(51) Int. Cl.
B60T 8/32    (2006.01)
(52) U.S. Cl. ........................ 303/141; 303/142; 303/151; 303/192
(58) Field of Classification Search ................. 303/141, 303/142, 151–152, 191, 192
See application file for complete search history.

(56) References Cited

U.S. PATENT DOCUMENTS 5,450,324 A * 9/1995 Cikanek ..................... 701/108
5,568,024 A    10/1996 Suzuki
5,696,683 A * 12/1997 Schafer et al. ................ 701/82
6,473,683 B1    10/2002 Nada

FOREIGN PATENT DOCUMENTS

| DE | 198 37 373 A1 | 2/2000 |
|---|---|---|
| DE | 101 24 989 A1 | 12/2002 |
| DE | 602 00 094 T2 | 11/2003 |

(Continued)

*Primary Examiner*—Bradley T King
(74) *Attorney, Agent, or Firm*—Kenyon & Kenyon LLP (57) ABSTRACT

In response to detection of a slip-down of a vehicle under restriction of a motor torque Tm*, which is required for a drive shaft linked with drive wheels, due to the occurrence of a slip caused by spin of the drive wheels on an ending slope, the technique of the invention multiplies a torque insufficiency by a ratio (reflection ratio β) specified according to a vehicle speed V in a t direction, so as to set a brake tourgue Tb*. The torque insufficiency corresponds to a difference between the restricted motor torque Tm* and a balancing torque Tgrad corresponding to a road surface gradient set according to the relation between an acceleration of the vehicle and a torque output to the drive shaft The setting of the brake torque Tb* makes the velocity of the slip-down of the vehicle approach to a preset vehicle speed. The brake torque Tb* is applied by hydraulic brakes attached to driven wheels which am different from the drive wheels. The arrangement of the invention regulates the velocity of the vehicle that slips down the ascending slope by the restriction of the motor torque Tm*.

10 Claims, 7 Drawing Sheets

| | FOREIGN PATENT DOCUMENTS | | |
|---|---|---|---|
| EP | 1 225 110 A1 | 7/2002 | |
| EP | 1 147 959 A3 * | 1/2003 | |
| GB | 2 377 475 A | 1/2003 | |
| JP | 07-322404 | 12/1995 | |
| JP | 2001-171377 A | 6/2001 | |
| JP | 2001-239853 A | 9/2001 | |
| JP | 2001-295676 | 10/2001 | |
| JP | 2002-264784 A | 9/2002 | |

* cited by examiner

VEHICLE AND CONTROL METHOD OF VEHICLE SLIP-DOWN VELOCITY

This is a 371 national phase application of PCT/JP2004/011005 filed 26 Jul. 2004, claiming priority to Japanese Patent Application No. 2003-203011 filed 29 Jul. 2003, the contents of which are incorporated herein by reference.

TECHNICAL FIELD

The present invention relates to a vehicle and a control method of the vehicle. More specifically the invention pertains to a vehicle equipped with a power output device that is capable of outputting a driving force to a drive shaft linked with drive wheels, as well as to a control method of a vehicle equipped with a power output device that is capable of outputting a driving force to a drive shaft linked with drive wheels and with a mechanical braking device that is capable of applying a mechanical braking force to the vehicle.

BACKGROUND ART

A proposed electric vehicle controls a motor linked with wheels to stop the vehicle in response to detection of a slip-down of the vehicle on an ascending slope (for example, see Japanese Patent Laid-Open Gazette No. 7-322404). This prior art vehicle specifies a slip-down state of the vehicle when the rotating direction of the motor is reverse to a gearshift position in a forward direction, and regulates the output torque of the motor to stop the vehicle with a slight step-on of an accelerator pedal.

This prior art vehicle, however, can not adequately respond to the occurrence of a slip on an ascending slope with the road surface of a low $\mu$ value. In the case of the occurrence of a slip, the general control restricts the output torque of the motor to reduce the slip. It is thus extremely difficult to prevent a slip-down of the vehicle on the ascending slope by regulating the output torque of the motor.

DISCLOSURE OF THE INVENTION

The vehicle and the control method of the vehicle of the invention thus aim to eliminate the drawbacks of the prior art technique and to regulate the velocity of a slip-down of the vehicle while reducing a slip on a road surface with a gradient. The vehicle and the control method of the vehicle of the invention also aim to ensure practically constant drive feeling, regardless of a road surface gradient.

In order to attain at least part of the above and the other related objects, the invention is directed to a vehicle and a control method of the vehicle as discussed below.

A vehicle of the present invention is equipped with a power output device that is capable of outputting a driving force to a drive shaft linked with drive wheels, and the vehicle includes: a mechanical braking device that is capable of applying a mechanical braking force to the vehicle; a slip detection module that detects a slip caused by spin of the drive wheels; a slip-down detection module that detects a slip-down of the vehicle; and a controller that actuates and controls the power output device to restrict the driving force output to the drive shaft in response to detection of a slip by the slip detection module, while actuating and controlling the mechanical braking device to apply a mechanical braking force to the vehicle in response to detection of a slip-down of the vehicle by the slip-down detection module under restricting the driving force output to the drive shaft.

The vehicle of the invention actuates and controls the power output device to restrict the driving force output to the drive shaft linked with the drive wheels, in response to detection of a slip caused by spin of the drive wheels. In response to detection of a slip-down of the vehicle under restricting the driving force output to the drive shaft, the vehicle of the invention actuates and controls the mechanical braking device to brake the vehicle with a mechanical braking force. This arrangement effectively regulates the velocity of a slip-down of the vehicle under restricting the driving force output to the drive shaft due to the occurrence of a slip on the road surface with a gradient.

The vehicle of the invention may include a running direction setting module that sets a running direction of the vehicle. In the vehicle of the invention, the slip-down detection module may include a reverse run detection module that detects a reverse run of the vehicle in a reverse direction to the running direction of the vehicle set by the running direction setting module, and the controller may actuate and control the mechanical braking device to apply a mechanical braking force to the vehicle, in response to detection of the reverse run by the reverse run detection module under restricting the driving force output to the drive shaft. In this case, the reverse run detection module may include a vehicle speed sensor that measures a vehicle speed in the reverse direction, and the controller may actuate and control the mechanical braking device to apply a braking force corresponding to the measured vehicle speed in the reverse direction. Further, the controller may actuate and control the mechanical braking device to make the vehicle speed in the reverse direction approach to a preset vehicle speed. This arrangement makes the velocity of the slip-down of the vehicle converge to the preset vehicle speed.

The vehicle of the invention may include a road surface gradient measurement estimation module that either measures or estimates a road surface gradient. In the vehicle of the invention, the controller may actuate and control the mechanical braking device to apply a braking force corresponding to the measured or estimated road surface gradient. This arrangement ensures practically constant drive feeling, regardless of the road surface gradient. In this case, the vehicle of the invention may further include a running direction setting module that sets a running direction of the vehicle. In the vehicle of the invention, the slip-down detection module may include a vehicle speed sensor that measures a vehicle speed in the reverse direction to the running direction of the vehicle set by the running direction setting module, the road surface gradient measurement estimation module may estimate the road surface gradient according to a relation between an acceleration of the vehicle and the driving force output to the drive shaft, and the controller may actuate and control the mechanical braking device to apply a braking force corresponding to a product of a balancing force, which balances with a force acting in a direction of the slip-down of the vehicle based on the relation between the acceleration of the vehicle and the driving force output to the drive shaft, and a ratio specified according to the measured vehicle speed in the reverse direction. In this case, the controller may actuate and control the mechanical braking device to make the vehicle speed in the reverse direction approach to a preset vehicle speed. This arrangement makes the velocity of the slip-down of the vehicle converge to the preset vehicle speed.

In the vehicle of the invention, the mechanical braking device may include a brake that applies a mechanical braking force to driven wheels, which are different from the drive wheels. This arrangement desirably prevents the braking force output from the mechanical braking device from interfering with the driving force output from the power output device.

A method of the invention is a control method of a vehicle, which is equipped with a power output device that is capable of outputting a driving force to a drive shaft linked with drive wheels, and with a mechanical braking device that is capable of applying a mechanical braking force to the vehicle, and includes the steps of: (a) detecting a slip caused by spin of the drive wheels; (b) actuating and controlling the power output device to restrict the driving force output to the drive shaft, in response to detection of a slip in the step (a); (c) detecting a slip-down of the vehicle; and (d) actuating and controlling the mechanical braking device to apply a mechanical braking force to the vehicle, in response to detection of a slip-down of the vehicle in the step (c) under restricting the driving force output to the drive shaft in the step (b).

The control method of the vehicle of the invention actuates and controls the power output device to restrict the driving force output to the drive shaft linked with the drive wheels, in response to detection of a slip caused by spin of the drive wheels. In response to detection of a slip-down of the vehicle under restricting the driving force output to the drive shaft, the control method of the invention actuates and controls the mechanical braking device to brake the vehicle with a mechanical braking force. This arrangement effectively regulates the velocity of a slip-down of the vehicle under restricting the driving force output to the drive shaft due to the occurrence of a slip on the road surface with a gradient.

BEST MODE FOR CARRYING OUT THE INVENTION

Figure 1:
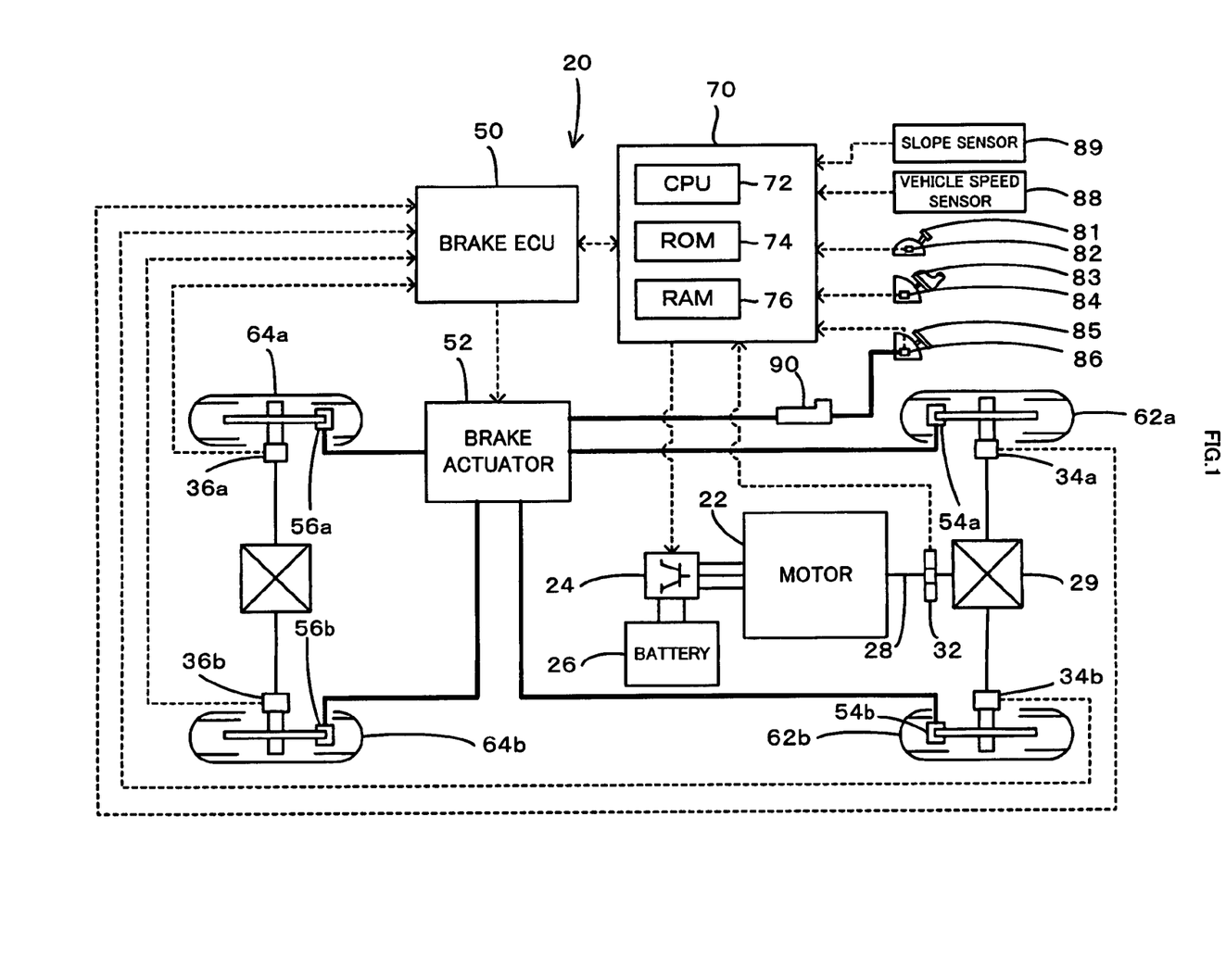
FIG. 1 schematically illustrates the configuration of a vehicle 20 in one embodiment of the invention.

One mode of carrying out the invention is discussed below as a preferred embodiment. FIG. 1 schematically illustrates the configuration of a vehicle 20 in one embodiment of the invention. As illustrated, the vehicle 20 of the embodiment includes a motor 22 that utilizes a supply of electric power from a battery 26 via an inverter circuit 24 and outputs power to a drive shaft 28, which is mechanically linked with drive wheels 62a and 62b via a differential gear 29, and a main electronic control unit 70 that controls the whole vehicle.

The motor 22 is a synchronous motor generator functioning as both a motor and a generator. The inverter circuit 24 includes multiple switching elements to convert an input of electric power from the battery 26 into an adequate form of electric power for driving the motor 22 and output the converted electric power.

Hydraulic brakes 54a, 54b, 56a, and 56b, which are actuated by means of hydraulic pressure from a brake master cylinder 90, are attached to the drive wheels 62a and 62b and driven wheels 64a and 64b. Activation and control of a brake actuator 52 by a brake electronic control unit (hereafter referred to as brake ECU) 50 regulates the braking torques of the hydraulic brakes 54a, 54b, 56a, and 56b. The brake ECU 50 is constructed as a microprocessor including a CPU, a ROM that stores processing programs, a RAM that temporarily stores data, input and output ports, and a communication port, although not being specifically illustrated. The brake ECU 50 receives, via its input port, input signals from various sensors, for example, wheel speeds from wheel speed sensors 34a, 34b, 36a, and 36b that measure rotational speeds of the drive wheels 62a and 62b and the driven wheels 64a and 64b. The brake ECU 50 outputs control signals to the brake actuator 52 via its output port. The brake ECU 50 establishes communication with the main electronic control unit 70 via its communication port to activate and control the brake actuator 52 in response to control signals from the main electronic control unit 70 and to send input data to the main electronic control unit 70 according to the requirements.

The main electronic control unit 70 is constructed as a microprocessor including a CPU 72, a ROM 74 that stores processing programs, a RAM 76 that temporarily stores data, non-illustrated input and output ports, and a non-illustrated communication port. The main electronic control unit 70 receives, via its input port, various input signals including a rotational position θres from a rotational position detection sensor 32 (for example, a resolver) that detects the rotational position of the drive shaft 28 (the rotating shaft of the motor 22), a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and a road surface gradient θgr from a slope sensor 89. The main electronic control unit 70 outputs switching control signals to the switching elements included in the inverter circuit 24 via its output port.

Figure 2:
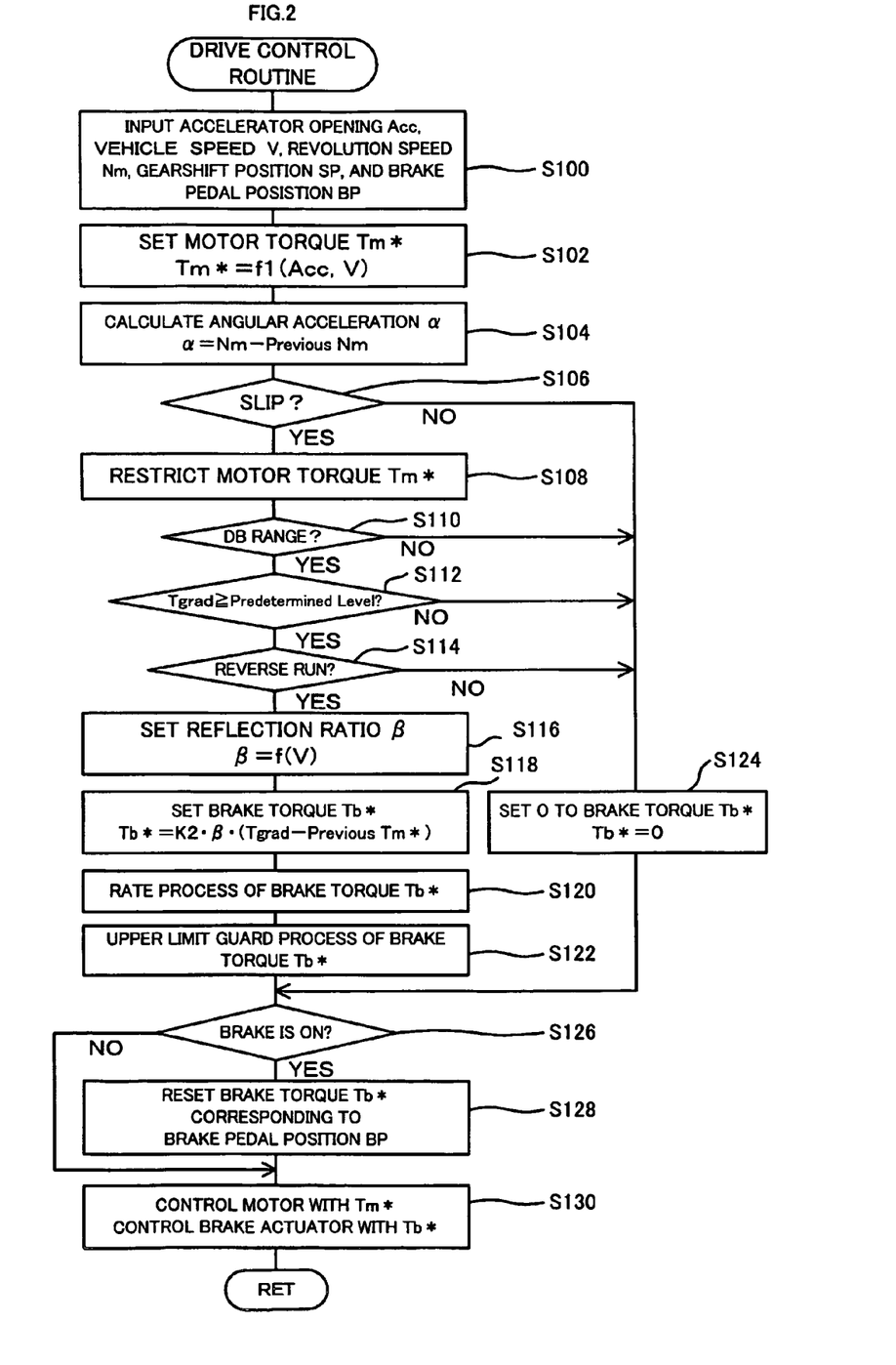
FIG. 2 is a flowchart showing a drive control routine executed by a main electronic control unit 70 in the vehicle 20 of the embodiment.

The following describes the operations of the vehicle 20 of the embodiment constructed as discussed above, especially a series of operations in the event of the occurrence of a slip due to the spin of the drive wheels 62a and 62b during a run of the vehicle 20 on an ascending slope. FIG. 2 is a flowchart showing a drive control routine executed by the main control unit 70 in the vehicle 20 of the embodiment. This routine is carried out repeatedly at preset time intervals (for example, 8 msec).

When the drive control routine starts, the CPU 72 of the main electronic control unit 70 first inputs various data required for control, that is, the accelerator opening Acc from the accelerator pedal position sensor 84, the vehicle speed V from the vehicle speed sensor 88, a revolution speed Nm of the drive shaft 28, the gearshift position SP from the gearshift position sensor 82, and the brake pedal position BP from the brake pedal position sensor 86 (step S100). In this embodiment, the input of the revolution speed Nm of the drive shaft 28 is calculated from the rotational position θres detected by the rotational position detection sensor 32.

Figure 3:
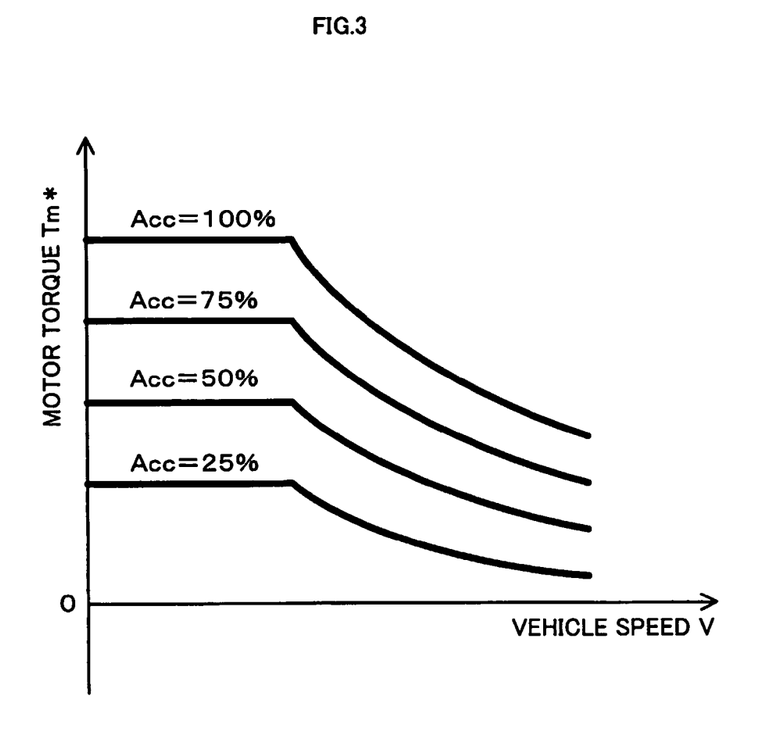
FIG. 3 is a map showing variations in motor torque Tm* against accelerator opening Acc and vehicle speed V.

The routine then sets a motor torque Tm*, which is to be output from the motor 22, based on the inputs of the accelerator opening Acc and the vehicle speed V (step S102). In the structure of this embodiment, variations in motor torque Tm* against the accelerator opening Acc and the vehicle speed V are specified in advance and are stored as a map in the ROM 74. The procedure of the embodiment reads and sets the motor torque Tm* corresponding to the given accelerator opening Acc and the given vehicle speed V from the stored map. FIG. 3 shows one example of this map.

The routine subsequently calculates an angular acceleration α of the drive shaft 28 from the inputs of the revolution speed Nm (step S104). The angular acceleration α is computed by subtracting a previous revolution speed Nm input in the previous cycle of this routine from a current revolution speed Nm input in the current cycle of this routine (current revolution speed Nm–previous revolution speed Nm). The unit of the angular acceleration α in this embodiment is [rpm/8 msec], as the revolution speed Nm is expressed by the revolutions per minute [rpm] and the time interval of execution of this routine is 8 msec. Any other suitable unit may be adopted to express the angular acceleration as a time variation in angular velocity. With a view to reducing a potential error, the angular acceleration α may be the average of current and past data of the angular acceleration calculated in the current and several past cycles (for example, three past cycles) of this routine.

After calculation of the angular acceleration α, the routine determines whether a slip occurs due to the spin of the drive wheels 62a and 62b (that is, the occurrence or non-occurrence of a slip or the convergence or non-convergence of a slip), based on the calculated angular acceleration α (step S106). The occurrence or non-occurrence of a slip may be specified by determining whether the angular acceleration α exceeds a predetermined threshold. The convergence or non-convergence of a slip may be specified by determining whether the angular acceleration α falls to a negative value or whether the angular acceleration α remains negative for a preset time period. Another technique may be adopted for such determination.

In the case of the occurrence of a slip, the routine restricts the motor torque Tm* set at step S102 (step S108). Restriction of the motor torque Tm* may subtract a fixed value from the motor torque Tm* or may subtract a varying value, which increases with an increase in degree of the slip, for example, an increase in angular acceleration α, from the motor torque Tm*. Any other suitable method may be applied to attain the restriction.

Figure 4:
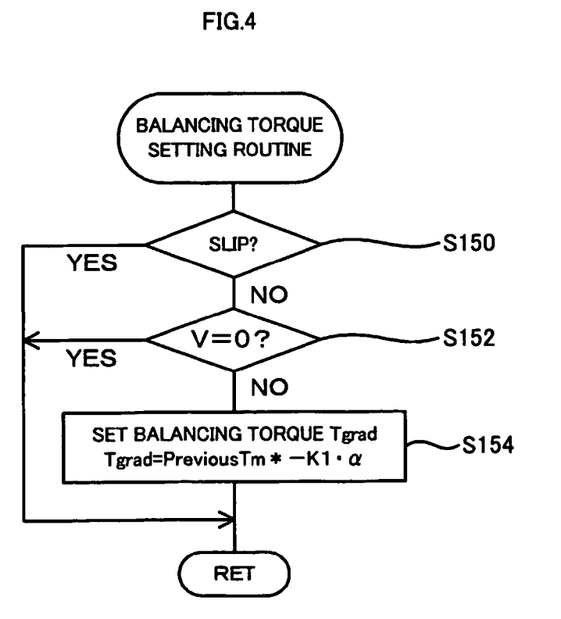
FIG. 4 is a flowchart showing a balancing torque setting routine executed by the main electronic control unit 70 in the vehicle 20 of the embodiment.

After the restriction of the motor torque Tm*, the routine successively determines whether the current gearshift position SP is in a forward drivable range, that is, in either a D range or a B range (step S110), whether a balancing torque Tgrad corresponding to the road surface gradient is not less than a predetermined level regarded as an ascending slope (step S112), and whether the vehicle runs in a reverse direction against the current gearshift position SP in the forward direction, that is, whether a slip-down of the vehicle is detected (step S114). In this embodiment, the balancing torque Tgrad is set according to a balancing torque setting routine shown in the flowchart of FIG. 4. As shown in FIG. 4, in the case of the non-occurrence of a slip and the vehicle speed V not equal to zero (steps S150 and S152), the balancing torque Tgrad is set according to Equation (1) given below as a torque balancing with a force generated by the weight of the vehicle to act in a direction along the road surface gradient (step S154). The term 'Previous Tm*' in Equation (1) represents the motor torque Tm* used as the torque output to the drive shaft 28 at step S130 in the previous cycle of the routine of FIG. 2 'K1' denotes a constant specified according to the vehicle weight and the diameter of the wheels.

$$Tgrad = \text{Previous } Tm^* - K1 \cdot \alpha \quad (1)$$

Figure 5:
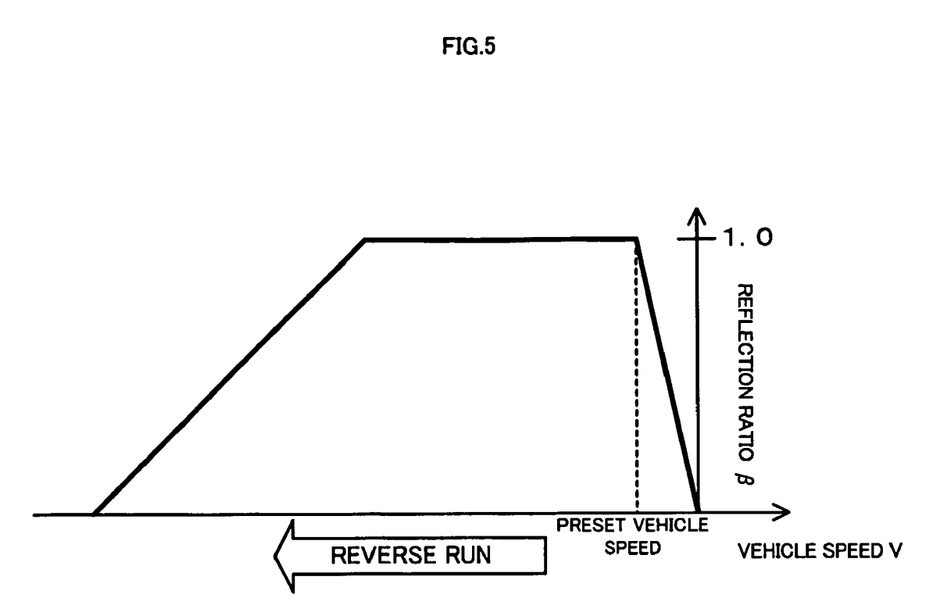
FIG. 5 is a map showing a variation in reflection ratio β against vehicle speed V in a reverse direction.

When the results of the successive determination at steps S110 to S114 show that the current gearshift position SP is in either the D range or the B range, that the balancing torque Tgrad is not less than the predetermined level, and that the vehicle runs in the reverse direction, the routine sets a reflection ratio β based on the input vehicle speed V (step S116). In the structure of this embodiment, a variation in reflection ratio β against the vehicle speed V is specified in advance and is stored as a map in the ROM 74. The procedure of this embodiment reads and sets the reflection ratio β corresponding to the given vehicle speed V from the stored map. FIG. 5 shows one example of this map. In the illustrated example, the reflection ratio β is regulated to proportionally increase from a value '0' to a value '1.0' during a rise of the vehicle speed V in the reverse direction from zero to a preset vehicle speed and to be kept at the value '1.0' after the vehicle speed V reaches the preset vehicle speed. After setting the reflection ratio β, the routine calculates a brake torque Tb* from the balancing torque Tgrad, the torque output to the drive shaft 28 (Previous Tm*), and the reflection ratio β according to Equation (2) given below (step S118). Here the brake torque Tb* represents a torque to be applied by the hydraulic brakes 56a and 56b attached to the driven wheels 64a and 64b, which are different from the drive wheels 62a and 62b linked with the drive shaft 28 with the motor 22. In Equation (2), 'K2' denotes a conversion coefficient to convert a torque on the drive shaft 28 into a torque on the shaft of the driven wheels 64a and 64b. As clearly understood from Equation (2), the brake torque Tb* is set as the product of a torque insufficiency relative to the balancing torque Tgrad due to the restriction of the motor torque Tm* at step S108 and the reflection ratio β. As mentioned above, the reflection ratio β is kept at the value '1.0' after the vehicle speed V in the reverse direction reaches the preset vehicle speed. The velocity of the slip-down of the vehicle thus converges to a value close to the preset vehicle speed.

$$Tb^* = K2 \cdot \beta \cdot (Tgrad - \text{Previous } Tm^*) \quad (2)$$

After setting the brake torque Tb*, the routine successively executes a rate process of the brake torque Tb* to attain a smooth increase or decrease in brake torque (step S120) and a guard process to guard the brake torque Tb* with an upper limit torque Tbmax (step S122). Here the rate used in the rate process may be set equal to 32 Nm/16 msec for the increase in brake torque and 32 Nm/65 msec for the decrease in brake torque. The upper limit torque Tbmax used in the guard process may be set as a torque preventing a slip-down of the vehicle with two occupants on an ascending slope of approximately 14%.

When it is determined at step S106 that no slip occurs, when it is determined at step S110 that the gearshift lever 81 is not positioned in the forward drivable range, when it is determined at step S112 that the balancing torque Tgrad is less than the predetermined level, or when it is determined at step S114 that the vehicle does not run in the reverse direction, the routine specifies no requirement for application of a brake torque by the hydraulic brakes 56a and 56b and sets the value '0' to the brake torque Tb* (step S124).

The routine subsequently determines whether the driver is stepping on the brake pedal 85, based on the current brake pedal position BP input at step S100 (step S126). When it is determined that the driver is stepping on the brake pedal 85, the routine resets the brake torque Tb* corresponding to the current brake pedal position BP for reflection of the driver's requirement, regardless of the setting of the brake torque Tb* at step S118 or at step S124 (step S128).

After setting of the motor torque Tm* and the brake torque Tb*, the routine drives and controls the motor 22 with the motor torque Tm*, while sending the brake torque Tb* to the brake ECU 50 to actuate and control the brake actuator 52 (step S130). The drive control routine is here terminated. The motor 22 is driven and controlled by outputting the switching control signals to the switching elements included in the inverter circuit 24. The brake ECU 50 receiving the input of the brake torque Tb* outputs a control signal to the brake actuator 52 to actuate and control the brake actuator 52.

As one example, it is assumed that a slip occurs during a run of the vehicle on an ascending slope with the gearshift lever 81 positioned in the D range. In this case, the motor torque Tm* required by the driver is restricted at step S108. When the restriction causes an insufficiency of the motor torque Tm* relative to the road surface gradient (the balancing torque Tgrad) in the course of convergence of the slip, a reverse run of the vehicle (a slip-down of the vehicle) is detected at step S114. In response to the detection, the brake torque Tb* is set to make the vehicle speed converge to the preset vehicle speed according to the balancing torque Tgrad and the vehicle speed in the reverse direction. The brake torque Tb* is accordingly applied by the hydraulic brakes 56a and 56b on the driven wheels 64a and 64b, which are different from the drive wheels 62a and 62b with the-torque output from the motor 22. This enables the velocity of the slip-down of the vehicle to converge to the preset vehicle speed.

As described above, in the vehicle 20 of the embodiment, in the event of a slip-down of the vehicle under restricting the output torque from the motor 22 due to the occurrence of a slip of the vehicle running on an ascending slope, the brake torque Tb* generated by the hydraulic brakes 56a and 56b is applied to make the velocity of the slip-down of the vehicle converge to the preset vehicle speed. The brake torque Tb* generated by the hydraulic brakes 56a and 56b is set according to the balancing torque Tgrad corresponding to the road surface gradient. This technique thus ensures practically constant drive feeling, regardless of the road surface gradient. The brake torque Tb* is applied to the driven wheels 64a and 64b, which are different from the drive wheels 62a and 62b with the torque output from the motor 22. This effectively prevents the brake torque from interfering with the output torque of the motor 22.

The vehicle 20 of the embodiment sets the balancing torque Tgrad corresponding to the road surface gradient according to the relation between the angular acceleration α and the output torque from the motor 22, and calculates the brake torque Tb* from the setting of the balancing torque Tgrad. One modified procedure may directly measure the road surface gradient with the slope sensor 89 and set the brake torque Tb* according to the observed road surface gradient.

The vehicle 20 of the embodiment sets the reflection ratio β based on the vehicle speed V in the reverse direction and calculates the brake torque Tb* from the balancing torque Tgrad, the torque output to the drive shaft 28, and the reflection ratio β. One modified procedure may directly set the brake torque Tb* based on the vehicle speed V in the reverse direction, the balancing torque Tgrad, and the torque output to the drive shaft 28.

The vehicle 20 of the embodiment sets the reflection ratio P based on the vehicle speed V in the reverse direction and multiplies the difference between the balancing torque Tgrad and the torque output to the drive shaft 28 by the setting of the reflection ratio β to set the brake torque Tb*. The velocity of the slip-down of the vehicle in the occurrence of a slip on an ascending slope thus converges to the preset vehicle speed. The brake torque Tb* may otherwise be set by feedback control to make the velocity of the slip-down of the vehicle converge to the preset vehicle speed.

Figure 6:
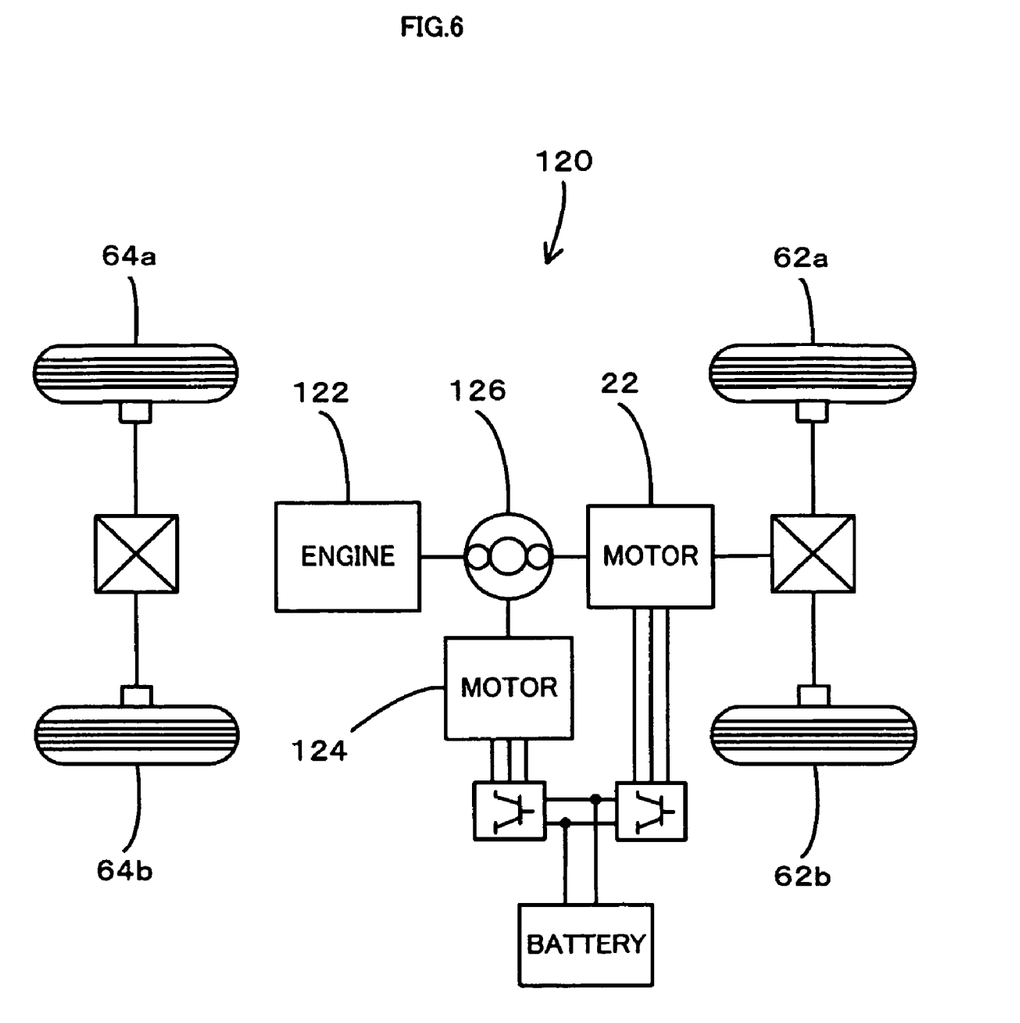
FIG. 6 schematically illustrates the configuration of a vehicle 120 in one modified example.
Figure 7:
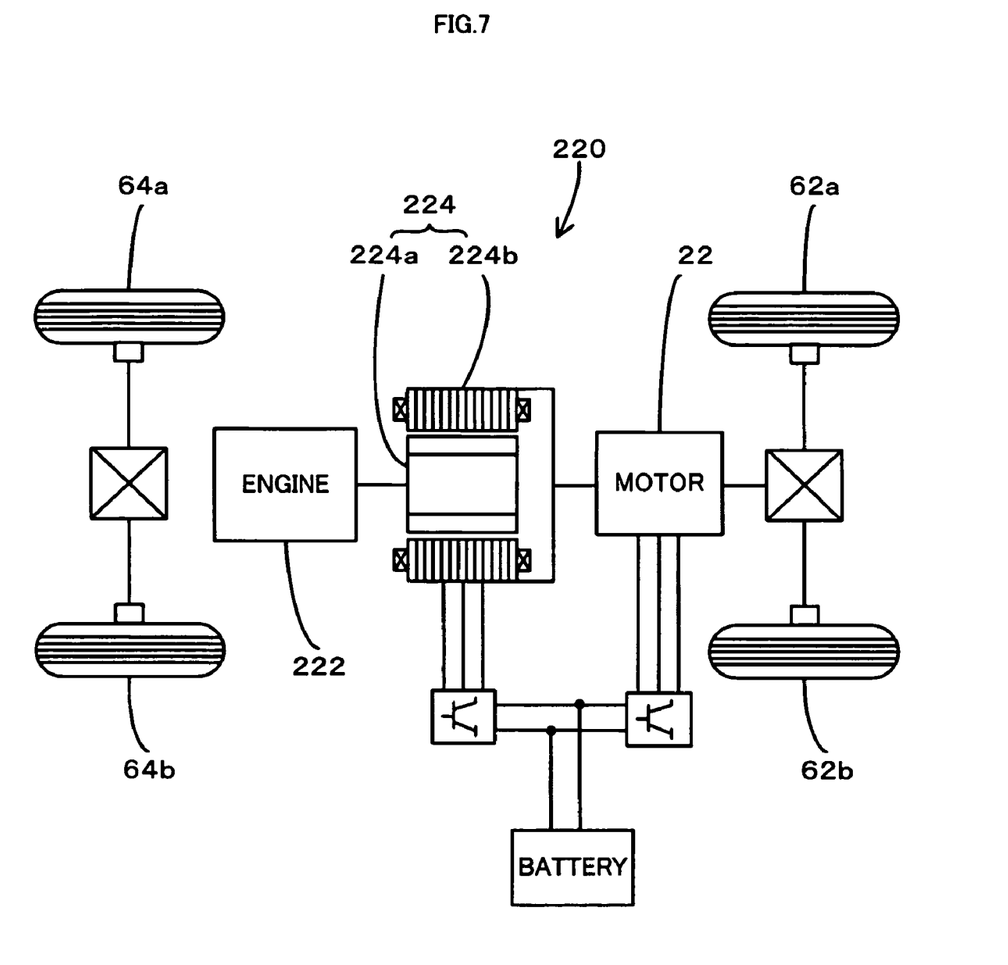
FIG. 7 schematically illustrates the configuration of a vehicle 220 in another modified example.
Figure 8:
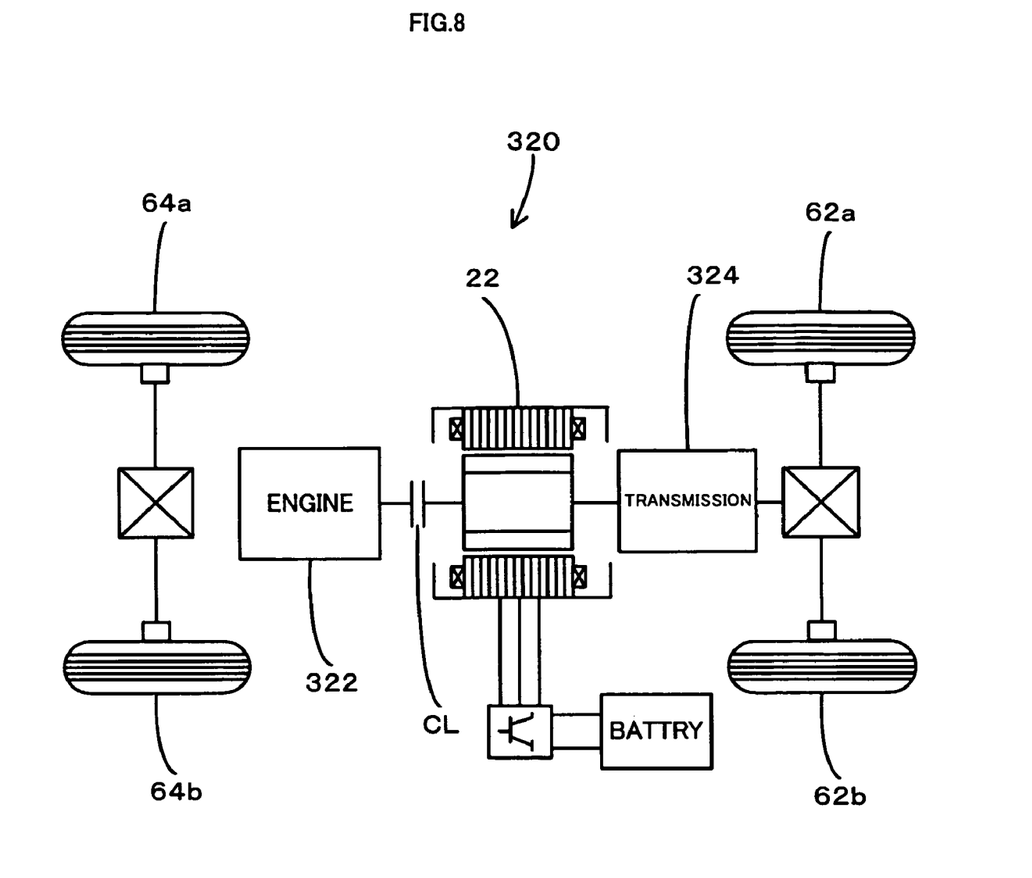
FIG. 8 schematically illustrates the configuration of a vehicle 320 in still another modified example.

The embodiment discussed above regards the vehicle 20 equipped with the motor 22 that is mechanically connected to directly output power to the drive shaft linked with the drive wheels 62a and 62b. The technique of the invention may be applied to any vehicle equipped with a power output device that is capable of outputting power to a drive shaft. For example, the technique of the invention is applicable to a series hybrid vehicle including an engine, a generator that is linked with an output shaft of the engine, and a motor that utilizes a supply of electric power from the generator to output power to a drive shaft. The technique of the invention is also applicable to a mechanical distribution-type hybrid vehicle 120 of FIG. 6 including an engine 122, a planetary gear unit 126 that is linked with the engine 122, a motor 124 that is connected with the planetary gear unit 126 and generates electric power, and a motor 22 that is connected with the planetary gear unit 126 and is mechanically linked with a drive shaft connecting with drive wheels 62a and 62b to output power to the drive shaft. The technique is further applicable to an electrical distribution-type hybrid vehicle 220 of FIG. 7 including an engine 222, a motor 224 that has an inner rotor 224a linked with an output shaft of the engine 222 and an outer rotor 224b attached to a drive shaft connecting with drive wheels 62a and 62b and relatively rotates through electromagnetic functions of the inner rotor 224a to the outer rotor 224b, and a motor 22 that is mechanically linked with the drive shaft to output power to the drive shaft. The technique is also applicable to a hybrid vehicle 320 of FIG. 8 including a motor 22 that is linked via a transmission 324 (for example, a continuously variable transmission or an automatic step transmission) with a drive shaft connecting with drive wheels 62a and 62b, and an engine 322 that is linked with a rotating shaft of the motor 22 via a clutch CL. In the event of the occurrence of a slip on the drive wheels, the control procedure mainly controls the motor mechanically linked with the drive shaft by taking into account its quick output response and thereby restricts the torque output to the drive shaft. Control of another motor and control of the engine may be carried out in cooperation with the control of this motor.

The embodiment discussed above is to be considered in all aspects as illustrative and not restrictive. There may be many modifications, changes, and alterations without departing from the scope or spirit of the main characteristics of the present invention.

INDUSTRIAL APPLICABILITY

The technique of the invention is applicable to industries relating to vehicles like automobiles and train cars.

The invention claimed is:

1. A vehicle equipped with a power output device that is capable of outputting a driving force to a drive shaft linked with drive wheels, said vehicle comprising:
   a mechanical braking device that is capable of applying a mechanical braking force to said vehicle;
   a slip detection module that detects a slip caused by spin of the drive wheels;
   a running direction setting module that sets a running direction of said vehicle;
   a slip-down detection module that detects vehicle speed in a reverse direction, which is reverse to the running direction of said vehicle set by said running direction setting module, thereby detecting a reverse run of said vehicle in the reverse direction and a slip-down of said vehicle;

a balancing force setting module that sets a balancing force, which balances with a force acting in a direction of the slip-down of the vehicle, based on a relation between an acceleration of said vehicle and the driving force output to the drive shaft; and a controller that actuates and controls said power output device to restrict the driving force output to the drive shaft in response to detection of a slip by said slip detection module, said controller actuating and controlling said mechanical braking device to apply a mechanical braking force determined based on the set balancing force and the detected vehicle speed in the reverse direction to said vehicle in response to detection of a slip-down of said vehicle by said slip-down detection module under restricting the driving force output to the drive shaft.

2. A vehicle in accordance with claim 1, wherein said controller actuates and controls said mechanical braking device to make the vehicle speed in the reverse direction approach to a preset vehicle speed.

3. A vehicle in accordance with claim 1, said vehicle further comprising:

a road surface gradient measurement estimation module that either measures or estimates a road surface gradient, wherein said controller actuates and controls said mechanical braking device to apply a braking force corresponding to the measured or estimated road surface gradient.

4. A vehicle in accordance with claim 3, wherein said road surface gradient measurement estimation module estimates the road surface gradient according to the relation between the acceleration of said vehicle and the driving force output to the drive shaft, and wherein the braking force is based on a ratio specified according to the measured vehicle speed in the reverse direction.

5. A vehicle in accordance with claim 4, wherein said controller actuates and controls said mechanical braking device to make the vehicle speed in the reverse direction approach to a preset vehicle speed.

6. A vehicle in accordance with claim 1, wherein said mechanical braking device comprises a brake that applies a mechanical braking force to driven wheels, which are different from the drive wheels.

7. A control method of a vehicle, said vehicle being equipped with a power output device that is capable of outputting a driving force to a drive shaft linked with drive wheels, and with a mechanical braking device that is capable of applying a mechanical braking force to said vehicle, said control method comprising the steps of:

(a) detecting a slip caused by spin of the drive wheels;

(b) actuating and controlling said power output device to restrict the driving force output to the drive shaft, in response to detection of a slip in said step (a);

(c) detecting a slip-down of said vehicle by detecting vehicle speed in a reverse direction to a running direction set by a running direction setting module;

(d) setting a balancing force that balances with a force acting in a direction of the slip-down of the vehicle, based on a relation between an acceleration of the vehicle and the driving force output to the drive shaft; and (e) actuating and controlling said mechanical braking device to apply a mechanical braking force to said vehicle, in response to detection of a slip-down of said vehicle in said step (c) under restricting the driving force output to the drive shaft in said step (b), wherein the braking force is determined based on the set balancing force and the detected vehicle speed in the reverse direction.

8. A vehicle in accordance with claim 1, wherein said power output device includes an electric motor that is capable of outputting power from said drive shaft.

9. A vehicle in accordance with claim 8, wherein said power output device comprises: an internal combustion engine;

a three-shaft power input output module that is connected with three shafts, that is, an output shaft of said internal combustion engine, said drive shaft, and a third shaft and, when powers input into and output from any two shafts among the three shafts are specified, determines power input into and output from a residual shaft, based on the specified powers;

a generator that is capable of inputting and outputting power from and to said third shaft.

10. A vehicle in accordance with claim 8, wherein said power output device comprises: and internal combustion engine; and a pair-rotor motor having a first rotor, which is linked with said output shaft of said internal combustion engine, and a second rotor, which is linked with said drive shaft and relatively rotates through electromagnetic interaction between the first rotor and the second rotor.

* * * * *